United States Patent [19]

Sublett

[11] 4,252,940

[45] Feb. 24, 1981

[54] COPOLYESTER ADHESIVES

[75] Inventor: Bobby J. Sublett, Kingsport, Tenn.

[73] Assignee: Eastman Kodak Company, Rochester, N.Y.

[21] Appl. No.: 81,232

[22] Filed: Oct. 2, 1979

[51] Int. Cl.$^3$ ............................................. C08G 63/16
[52] U.S. Cl. .................................... 528/302; 156/332; 528/309
[58] Field of Search ................. 528/302, 309; 156/332

[56] References Cited

U.S. PATENT DOCUMENTS

| | | | |
|---|---|---|---|
| 3,853,665 | 12/1974 | Gardziella | 260/28 R X |
| 3,948,859 | 4/1976 | Sublett et al. | 528/304 X |
| 4,094,721 | 6/1978 | Strum et al. | 528/302 X |

*Primary Examiner*—Lucille M. Phynes
*Attorney, Agent, or Firm*—John F. Stevens; Daniel B. Reece, III

[57] ABSTRACT

Copolyester adhesives are disclosed which are derived from at least 40 mol percent terephthalic acid, up to about 60 mol percent of another dicarboxylic acid selected from isophthalic, succinic, adipic, and glutaric, and a blend of 1,6-hexanediol and diethylene glycol. These copolyesters are useful as adhesives, and especially useful as fusible interlining adhesives.

10 Claims, No Drawings

COPOLYESTER ADHESIVES

BACKGROUND OF THE INVENTION

1. Field of the Invention

This invention relates to certain copolyesters which have been found to be useful as adhesives, especially fabric interlining adhesives.

2. Description of Prior Art

A fusible interlining is a material such as fabric which has been coated on one side with a discontinuous pattern of fusible adhesive. When the interlining is bonded to a face fabric in a garment, it provides body and shape to the garment without impairing the ability of the fabric to breathe. Fusible interlinings are used, for example, in the manufacture of men's and women's suits, in shirt collars and cuffs, and in the waistbands of trousers. In the manufacture of suits, polycarbonate basting threads are frequently used to temporarily hold the parts of the suit in place. After the suit is completed, a solvent such as perchloroethylene or trichloroethylene is used to embrittle the polycarbonate thread so that it may be brushed from the fabric.

Certain polyesters are useful for fusible interlining applications. However, these polymers also tend to have certain disadvantages. For example, one polyester of interest is the copolyester of terephthalic acid, adipic acid, ethylene glycol and 1,4-butanediol as described in U.S. Pat. No. 3,669,921. Such polyesters tend to block in pellet form and Cab-O-Sil fumed silica, a product of Cabot Corporation, must be added in significant amounts to make it possible to grind this polymer into powder. Excessive amounts of Cab-O-Sil in the powder, however, prevent good coatability and good fusion of the powders on the fusible interlining fabric when applied with powder point applicators.

The use of polyesters with a melting point of 160° to 220° C. which are composed of terephthalic acid plus, in some cases, isophthalic acid and one or more glycols having 2 to 10 carbon atoms is disclosed in U.S. Pat. No. 3,853,665. Ethylene glycol, propylene glycol, butylene glycol, pentanediols or hexanediols are proposed as the glycols. As glycol mixtures, those mixtures are used which contain ethylene glycol, examples being ethylene glycol plus 1,6 hexanediol or ethylene glycol plus 1,4 butanediol. Such copolyesters have the disadvantage in that they have relatively high melting points. They are therefore usable to only a limited extent as coating substances to be applied in the molten state or as fusion adhesives for heat-sensitive materials.

Copolyesters generally have lower melting points than homopolyesters. For example, the melting point of a polyester of terephthalic acid and ethylene glycol is around 260° C. A polyester consisting of 90 mole % of terephthalic acid and 10 mole % of isophthalic acid in which ethylene glycol has been used as the diol component, has a melting point of 236° C. When the molar ratio of terephthalic acid to isophthalic acid is 80:20, a copolyester is obtained which has a melting point of 210° C. When the ratio of terephthalic acid to isophthalic acid is 70:30 the melting point drops to 185° C.

Conditions are similar when ethylene glycol is replaced by 1,4 butanediol. A polybutylene terephthalate comparable to polyethylene terephthalate has a melting point of 225° C.

In German "Offenelegunggaschrift" No. 1,920,432 there is disclosed a dry-cleaning fluid resistant polyester fusion adhesive prepared from (1) terephthalic acid and ethylene glycol, (2) adipic acid and 1,4 butanediol. The molar ratio of terephthalic acid to adipic acid ranges from a predominance of terephthalic acid to a predominance of adipic acid, and the molar ratio of ethylene glycol to 1,4 butanediol ranges from a predominance of ethylene glycol to a predominance of 1,4 butanediol. Such polyesters are used for bonding textiles. The copolyesters prepared in accordance with the example has a softening point of 135° C. This softening point, however, is still too high for many heat-sensitive materials which are to be laminated or are to be provided with a melted or sintered coating such as artificial leather, natural leather. If the molar ratios of the individual components of these copolyesters are varied, it is possible to arrive at a copolyester having a softening point of 110° C. (terephthalic acid:adipic and molar ratio 60:40 ethylene glycol:1,4 butanediol ratio 60:40. The degree of crystallization of this copolyester however, is already so low that it is not suitable for a fusion adhesive. Disadvantages reside in both the surface stickiness of the coated substrate and the stickiness of the copolyesters which is considerable even at room temperature. Copolyesters of this type are not suitable for the preparation of coating substances in powder form or adhesives in powder form such as required, for example, in the textile field.

It is well known in the art that the crystallinity of a polyester is one parameter which may be used to determine solvent resistance, i.e., the more amorphous (less crystalline), the more susceptible to dry-cleaning solvents the polyester will be. It is also known that the inherent property of glass transistion temperature is also a parameter by which the temperature at which a polyester, even an amorphous polyester, will be effected by a solvent.

It is also known that modification of a homopolyester by copolymerization with other acid or glycol moieties or combinations of glycol and acid moieties to form copolymers or terpolymers drastically reduces or eliminates crystallinity. The crystallinity of copolyesters is also dependent on the particular comonomers from which the copolyester is synthesized. For example, a polyester of terephthalic acid and 1,4 butanediol (even number of carbon atoms 4) will crystallize more readily than a polyester prepared from terephthalic acid and either 1,3 propanediol (odd number carbon atoms) or 1,5 pentanediol (odd number of carbon atoms). The crystallization phenomenon of copolyesters, especially those that are low melting, below 150° C., is unpredictable.

Amorphous polyesters cannot be used as fusion adhesives in which resistance to dry-cleaning agents and high set-up speed are required. In like manner, those polyesters are undesirable which have too little crystallinity, because they solidify too slowly and consequently do not lose their surface stickiness for days or in many cases even weeks.

Since the requirements of crystallinity, set-up time, melting point and resistance to dry-cleaning are so numerous and are so dependent on so many interrelated and unrelated inherent monomer and polymer properties it is impossible to precisely design or produce useful copolyesters for these applications.

Other low melting adhesives that we are aware of are those disclosed in U.S. Pat. No. 4,094,721 and U.S. Pat. No. 3,948,859.

SUMMARY OF THE INVENTION

In accordance with this invention, copolyesters suitable for use in applications where low melting adhesives are required and especially in fabric adhesive application, are provided. The copolyesters are prepared by copolymerizing the following:

(a) at least 40 mol percent terephthalic acid (TPA)
(b) up to 60 mol percent of another dicarboxylic acid selected from isophthalic, succinic, adipic and glutaric
(c) about 10 to about 90 mol percent 1,6 hexanediol, and
(d) about 90 to about 10 mol percent diethylene glycol (DEG).

Besides having good adhesive properties, these copolyesters are low melting to provide resistance against scorching these copolyesters sintering, are resistant to dry-cleaning solvents, have good grindability, etc.

DESCRIPTION OF THE INVENTION

The copolyesters provided by the present invention are especially useful as a fabric or textile adhesive. They are prepared by the condensation polymerization of an acid moiety and a glycol moiety at least 40 mol percent of the acid moiety being a terephthalic acid moiety, and up to 60 mol percent of another dicarboxylic acid moiety selected from moieties of isophthalic, succinic, adipic and glutaric, the glycol moieties being 10–90 mol percent 1,6-hexanediol moiety and 90–10 mol percent diethylene glycol moiety. Preferably, the mol percentages are about as follows: terephthalic acid, 75 to 85; other dicarboxylic acid, 25 to 15; 1,6-hexanediol, 75 to 85 and diethylene glycol, 25 to 15. The copolyesters should have an I.V. of about 0.4–1.2, a crystalline melting point of about 40°–130° C., preferably about 80°–115° C., and a glass transition temperature (Tg) of about −10° to about 30° C. The degree of crystallinity, measured by heat of fusion, $\Delta H_f$, should be greater than about 1.0 calorie per gram, preferably greater than about 3.0 calories per gram. The practical upper limit of $\Delta H_f$ is about 10 calories per gram. Also, the crystallization half time should be less than about 10 minutes at the maximum crystallization temperature.

The dicarboxylic acids and glycols specified for the copolyester are commercially available or they may be prepared by well known procedures. The mol percentages specified are on the basis of 100 mol percent dicarboxylic acid and 100 mol percent glycol. The copolyesters are prepared by reacting the acid or acids with the two glycols in a conventional manner well known in the art.

The crystalline melting point, $\Delta H_f$, and $T_g$ referred to above may be measured by a Differential Scanning Calorimeter.

Ester forming derivatives of the acids referred to herein can be employed, if desired, to prepare the copolyesters of this invention. Examples of such ester forming derivatives are the acids, anhydrides, esters and ester chlorides of such acids. For example, dimethyl terephthalate may be employed in place of terephthalic acid; dimethyl adipate can be used in place of adipic acid.

These copolyesters are readily put into powder form using conventional grinding techniques, preferably by cryogenic grinding. The powders are nonblocking and can be readily applied to fusible interlining fabrics from powder point applicators, from random sprinkling equipment, or in the form of a paste. The particles are finely divided, i.e., from about 1 micron to about 500 microns. In the application of powders from powder point applicators, it is desirable to have powders with a particle size range of 50–200 microns (270–70 mesh). For random sprinkling application on tightly woven or nonwoven fabrics, particle size of 150–300 microns (100–50 mesh) is desirable. For random sprinkling on open-weaver fabrics such as cheap rayon/cotton blends, powders with 300–500 micron size (50–35 mesh) are required. For application of powder in paste form, it is necessary to have very fine powders. For example, in paste form, powder size should be 1–80 micron (less than 200 U.S. mesh). The copolyesters may also be used in strip or powder form.

The hot melt adhesives according to this invention are especially desirable because of their good grindability, i.e., ability to be ground into a finely divided, free-flowing powdery form by conventional grinding techniques, and their resistance to blocking or caking during storage.

The "heat of fusion", $\Delta H_f$, of polymers is the amount of heat evolved when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science*, 20 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

One of the commonly used parameters for describing the crystallization rate of a polymer is the crystallization half-time, $t_{178}$. The crystallization half-time is simply the time at which the crystallization of the originally amorphous sample is half completed according to the method used to monitor crystallinity and may be determined in conventional manners. The half-time is strongly dependent on the crystallization temperature.

One way of determining the isothermal crystallization of a polymer is an approximation described by the Avrami equation $$X = X_o(1 - e^{-(\frac{t}{\tau})^n}) \quad (1)$$

where $X_o$ is the limiting value of the crystallinity, is a characteristic time determined by the polymer and the crystallization temperature, and n is the so-called Avrami exponent, generally in the range 2.0 to 3.5. The reduced crystallization half-time, $(t/\tau)_{\frac{1}{2}}$, is obtained by solving $$\frac{X}{X_o} = \frac{1}{2} = 1 - e^{-(\frac{t}{\tau})^n_{\frac{1}{2}}} \text{ to get} \quad (2)$$

$$(\frac{t}{\tau})_{\frac{1}{2}} = \sqrt[n]{\ln 2} \quad (3)$$

The DSC response obtained would be described by differentiating equation (1) with respect to time to get $$\frac{dX}{dt} = X_o \frac{n}{\tau}(\frac{t}{\tau})^{n-1} e^{-(\frac{t}{\tau})^n} \quad (4)$$

This function has a maximum for all n>1. Differentiating equation 4 with respect to time, setting the derivative equal to zero and solvent for $t/\tau$, one finds the maximum of $dX/dt$, which is the peak of the DSC curve, to be located at $$\frac{t_p}{(\tau)} = \sqrt[n]{\frac{n-1}{n}} \tag{5}$$

The ratio of $t_p/(\tau)$ to $(t/\tau)_{\frac{1}{2}}$ $$\frac{\left(\frac{t_p}{\tau}\right)}{\left(\frac{t}{\tau}\right)_{\frac{1}{2}}} = \frac{t_p}{t_{\frac{1}{2}}} = \sqrt[n]{\frac{n-1}{n \ln 2}} \tag{6}$$

the ratio $t_p/t_{\frac{1}{2}}$ is between 0.85 and 1.04 for $n \geq 2$. The curve of $t_p$ vs. crystallization temperature is a sufficient approximation of the curve $t_{\frac{1}{2}}$ vs. crystallization temperature.

When copolyesters prepared as described above are employed as melt adhesives to laminate various fabric systems, metal strips and the like, excellent bonds result. These bonds are found to be highly resistant to the action of dry cleaning solvents such as perchloroethylene. The strength of the bonds is determined by the so-called "Peel Test" based on a modification of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

One method for determining the grindability of polymer samples is to cryogenically grind 10 g. of polymer pellets for 1 minute in the presence of liquid nitrogen in a Micromill marketed by Chemical Rubber Company. The powder obtained is dried and seived through a 70 mesh screen. The grindability of a sample is defined as the percentage of powder which will pass through the 70 mesh screen.

If desired, dyes or dye receptive agents, color stabilizers and various other adjuvants may be added to the copolyester adhesives to meet certain specific end use requirements. Such additives would normally be added as such to the polymerization mixture in which the copolyester is produced.

As used herein, the inherent viscosity (I.V.) is measured at 25° C. using 0.50 gram of copolyester per 100 ml. of a solvent consisting of 60 percent by weight phenol and 40 percent by weight tetrachloroethane.

The following examples are submitted for a better understanding of the invention.

A typical copolyester prepared in accordance with this invention is as follows. 87.3 Grams (0.45 moles) of dimethyl terephthalate, 8 grams of dimethyl glutarate (0.05 moles), 56.64 grams of 1,6 hexanediol (0.48 moles) and 55.12 (0.52 moles) of diethylene glycol, and 1 ml of n-butanol solution of telanium tetraisopropoxide which is 1.24% telanium are weighed with a 500 ml. single-neck round-bottom flask equipped with a nitrogen inlet, stirrer, vacuum outlet and a condensing flask. The flask is heated at 200° C. in a metal bath for three hours with a nitrogen sweep over the reaction mixture. When the theoretical amount of methanol has distilled from the reaction mixture the metal bath temperature is increased to 260° C. and the pressure in the flask reduced to 0.5 to 0.1 mm of mercury. The flask is heated at 260° C. at a reduced pressure of 0.5 to 0.1 mm of mercury for 1 hr.

The flask is then removed from the bath and allowed to cool as the polyester crystallizes. Gas chromatographic analysis of the polymer reveals the copolyester contains the following mole percent of the reaction residues: dimethyl terephthalate, 90 mole %; dimethyl glutarate, 10 mole %, 1,6 hexanediol, 70 mole %; and 30 mole % diethylene glycol. The copolyester has an inherent viscosity of 0.78 and a crystalline melting point of 107° C. This copolyester is an excellent fabric adhesive.

The polyester adhesives, prepared as described above, are cryogenically ground and screened to obtain a powder that passes a 70 mesh screen. The powders are applied from an engraved roll to a cotton interlining fabric to form an interlining containing rows of adhesive dots across the interlining fabric. The interlining is used to bond two different face fabrics, wool/polyester and polyester/cotton. The interlinings are bonded to fabrics by pressing 4 inch squares of interlining to 4 inch squares of face fabric using either steam or an electric press. The bonded fabrics are laundered and dry cleaned then cut into strips 1 inch wide and T-peel strength determined using an Instron Tensile Tester before and after laundering and dry cleaning. The T-peel strengths are an average of three determinations per sample.

Examples of copolyester adhesives are shown in Table 1 in Examples 1 through 7. The examples show that copolyesters based on terephthalic acid and a second dicarboxylic acid, glutaric (Examples 1 and 2), adipic (Example 3), succinic (Example 4) and isophthalic (Examples 5, 6 and 7) and a mixed glycol system which is 1,6 hexanediol and diethylene glycol, produce copolyesters which are grindable into powder, have rapid crystallization rates, and have sufficient crystallinity, insolubility in dry cleaning solvents and low temperature bonding characteristics which make them useful as fabric adhesives. Example 8 is an example of a low melting copolyester (95° C.) which has some crystallinity ($\Delta H_f$ 2.5 cal/g.) and has good adhesion to polyester/cotton. However, the polymer has a slow crystallization rate from the melt and remains tacky for 30 minutes or longer after application and suffers a considerable loss of bond strength during dry cleaning. Example 9 contains terephthalic acid, 1,6 hexanediol and diethylene glycol (without a second acid), but will not adhere to polyester/cotton when bonded at 110° C., thus it is too high melting (143° C.) to be useful as a fabric adhesive for fragile fabrics. This copolyester will bond fabric at 160° C. but this bonding temperature is not satisfactory for most fabrics. Example 10 is another example of a low melting copolyester that requires too high bonding temperature for most fabrics and has poor adhesion when bonded at 110° C.

The copolyester in Example 11 has sufficient crystallinity ($\Delta H_f$ 5.1 cal/g.) and produces sufficient bond strength (1.8 lb.) when bonded at 110° C.; however, the copolyester suffers a severe loss in bond strength during dry cleaning. (T-peel strength is only 0.1 lb. after dry cleaning.) Example 12 is a copolyester ground into powder, and used to make an interlining which is tested as a fabric adhesive after bonding to a polyester/cotton face fabric. Examples 13 and 14 are examples of semicrystalline low melting copolyesters which will adhere to fabric when bonded at 110° C. but are not useful as fabric adhesives because of prolonged tackiness (slow crystallization rate), are very difficult to grind, and have poor resistance to dry cleaning solvents.

TABLE 1

| Example No. | 1 | 2 | 3 |
|---|---|---|---|
| Molar percentages of acid and glycol components | 80 terephthalic acid<br>20 glutaric acid<br>20 diethylene glycol<br>80 1,6-hexanediol | 85 terephthalic acid<br>15 glutaric acid<br>25 diethylene glycol<br>75 1,6-hexanediol | 75 terephthalic acid<br>25 adipic acid<br>15 diethylene glycol<br>85 1,6-hexanediol |
| Inherent viscosity | 0.76 | 0.87 | 0.81 |
| $\Delta H_f$, cal/g | 5.2 | 4.8 | 5.3 |
| T-Peel strength at 23° C. lb/in | 2.7 | 2.2 | 2.1 |
| T-Peel strength after dry cleaning (commercial) 5 cycles lb/in | 2.6 | 2.1 | 2.0 |
| Crystalline Melting point, °C. | 104 | 106 | 107 |
| Bonding Temperature, °C. | 110 | | |
| Type Failure | None | None | None |
| Grindability | Excellent | Excellent | Excellent |
| Crystallization Half Time (Min.) | 1.8 | 1.5 | 2 |

| Example No. | 4 | 5 | 6 |
|---|---|---|---|
| Molar percentages of acid and glycol components in polyester | 80 terephthalic acid<br>20 succinic acid<br>20 diethylene glycol<br>80 1,6-hexanediol | 75 terephthalic acid<br>25 isophthalic acid<br>15 diethylene glycol<br>85 1,6-hexanediol | 85 terephthalic acid<br>15 isophthalic acid<br>25 diethylene glycol<br>75 1,6-hexanediol |
| Inherent viscosity | 0.75 | 0.79 | 0.84 |
| $\Delta H_f$, cal/g | | | |
| T-Peel strength at 23° C. lb/in | 1.7 | 1.9 | 2.1 |
| T-Peel strength after dry cleaning (5 cycles) lb/in | 1.5 | 1.9 | 2.0 |
| Crystalline Melting point, °C. | 105 | 104 | 104 |
| Bonding temperature, °C. | 110 | 100 | 100 |
| Type failure | None | None | None |
| Grindability | Excellent | Excellent | Excellent |
| Crystallization Half Time (Min.) | 1 | 1.5 | 1.5 |
| Coating weight, g/yd | 16 | 22 | 15 |

| Example No. | 7 | 8 (Control) | 9 (Control) |
|---|---|---|---|
| Molar percentage of acid and glycol components in polyester | 85 terephthalic acid<br>15 isophthalic acid<br>35 diethylene glycol<br>65 1,6-hexanediol | 70 terephthalic acid<br>30 isophthalic acid<br>25 azealic acid<br>100 1,4-butanediol | 100 terephthalic acid<br>90 1,6-hexanediol<br>10 diethylene glycol |
| Inherent viscosity | 0.72 | 0.84 | 0.76 |
| $\Delta H_f$, cal/g | 4.5 | 2.5 | 8.0 |
| T-Peel strength at 23° C. lb/in | 2.2 | 2.1 | 0.0 |
| T-Peel strength after dry cleaning (5 cycles) lb/in | 2.1 | 0.8 | — |
| Crystalline Melting point, °C. | 104 | 95 | 143 |
| Bonding Temperature, °C. 110 | Yes | | Won't Bond |
| Type Failure | None | Polymer tacky 30 min. and poor dry-clean resistance | — |
| Grindability | Excellent | Poor | Excellent |
| Crystallization Half Time (Min.) | 2.2 | >20 | <1 |

| Example No. | 10 (Control) | 11 (Control) | 12 |
|---|---|---|---|
| Molar percentages of acid and glycol components in polyester | 80 terephthalic acid<br>20 isophthalic acid<br>100 1,6-hexanediol | 65 terephthalic acid<br>35 1,4-cyclohexane-dicarboxylic acid<br>100 1,6-hexanediol | 84 terephthalic acid<br>16 isophthalic acid<br>60 1,6-hexanediol<br>40 1,4-butanediol |
| Inherent viscosity | 0.72 | 0.82 | 0.64 |
| $\Delta H_f$, cal/g | 6.5 | 5.1 | 3.86 |
| T-Peel strength at 23° C. lb/in | 0.2 | 1.8 | 2.1 |
| T-Peel strength after dry cleaning (5 cycles) lb/in | 0.2 | 0.1 | 1.9 |
| Crystalline Melting point, °C. | 130 | 11° C. | 112 |
| Bonding Temperature, °C. 110 | | | |
| Type Failure | Poor Adhesion | Poor dry cleaning | None |
| Grindability | Excellent | Excellent | Excellent |
| Coating wt., g/yd$^2$ | 20 | 18 | 20 |

TABLE 1-continued

| | | |
|---|---|---|
| Crystallization Half Time (Min.) | 1.5 | 1 | 2 |

| Example No. | 13 (Control) | 14 (Control) |
|---|---|---|
| Molar percentages of acid and glycol components in polyester | 50 terephthalic acid<br>50 adipic acid<br>100 ethylene glycol | 50 terephthalic acid<br>20 isophthalic acid<br>30 azealic acid<br>100 1,4 butanediol |
| Inherent viscosity | 0.78 | 0.84 |
| $\Delta H_f$, cal/g | 1.2 | 1.45 |
| T-Peel strength at 23° C, lb/in | 2.1 | 2.0 |
| T-Peel strength after dry cleaning (5 cycles) | 0.4 | 0.3 |
| Crystalline Melting point, °C. | 110 | 115 |
| Bonding temperature, °C. | 110 | 110 |
| Type Failure | Tacky, dry-clean Failure | Tacky, dry-clean Failure |
| Grindability | Poor | Poor |
| Coating weight, g/yd² | 21 | 19 |
| Crystallization Half Time, (Min.) | >20 | >15 |

The invention has been described in detail with particular reference to certain preferred embodiments thereof, but it will be understood that variations and modifications can be effected within the spirit and scope of the invention.

I claim:

1. A copolyester of an acid moiety and a glycol moiety, at least 40 mol percent of said acid moiety being a terephthalic acid moiety, said glycol moiety being about 10 to about 90 mol percent of a 1,6-hexanediol moiety and about 90 to about 10 mol percent of a diethylene glycol moiety, said copolyester having a crystalline melting point of about 40°–130° C., a glass transition temperature of about −10° to about 30° C. and a heat of fusion of about 1–10 calories per gram.

2. A copolyester according to claim 1 wherein the crystallization half time is less than about 10 minutes at the maximum crystallization temperature.

3. A copolyester according to claim 1 wherein the terephthalic acid moiety is present in an amount of about 75–85 mol % and about 25–15 mol percent of said acid moiety being selected from moieties of isophthalic, succinic, adipic and glutaric, the 1,6-hexanediol moiety is present in an amount of about 75–85 mol % and the diethylene glycol moiety is present in an amount of about 25-15 mol %.

4. A copolyester according to claim 1 wherein the crystalline melting point is about 80°–115° C.

5. A copolyester according to claim 1 wherein the $\Delta H_f$ is greater than about 3.0 calories per gram.

6. A copolyester derived essentially from at least 40 mol percent terephthalic acid, about 10 to about 90 mol percent 1,6-hexanediol and about 90 to about 10 mol percent diethylene glycol, said copolyester having a crystalline melting point of about 80°–115° C., a glass transition temperature of about −10° to about 30° C. and a heat of fusion of at least 3.0 calories per gram.

7. A fusible interlining adhesive comprising a copolyester derived from at least 40 mol percent terephthalic acid, about 10 to about 90 mol percent 1,6-hexanediol and about 90 to about 10 mol percent diethylene glycol, said copolyester having a crystalline melting point of about 40°–130° C., a glass transition temperature of about −10° to about 30° C. and a heat of fusion of about 1–10 calories per gram.

8. A fusible interlining adhesive in powder form comprising the copolyester of claim 7.

9. A fusible interlining adhesive comprising a copolyester derived from at least 40 mol percent terephthalic acid, about 10 to about 90 mol percent 1,6-hexanediol and about 90 to about 10 mol percent diethylene glycol, said copolyester having a crystalline melting point of about 80°–115° C., a glass transition temperature of about −10° to about 30° C. and a heat of fusion of at least 3.0 calories per gram.

10. A fusible interlining adhesive in powder form comprising the copolyester of claim 9.

* * * * *